July 10, 1973 N. C. JACKSON 3,745,056
TRIM STRIP STRUCTURE
Filed April 5, 1971 2 Sheets-Sheet 1
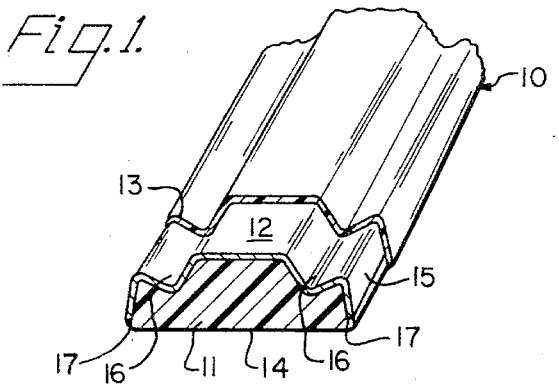
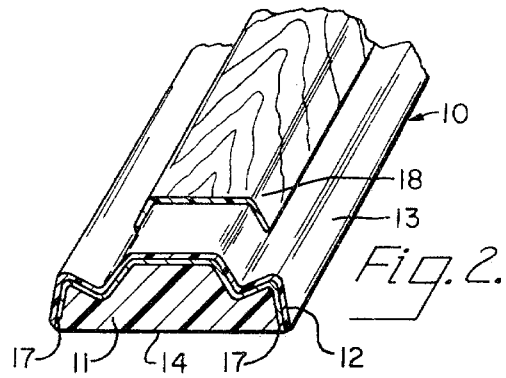
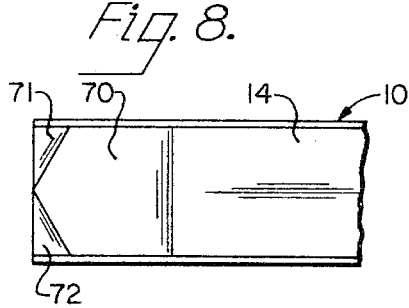
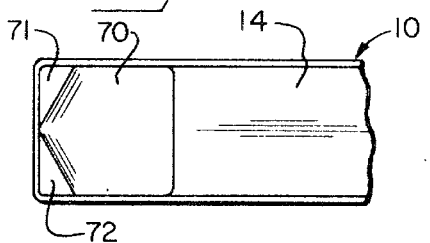
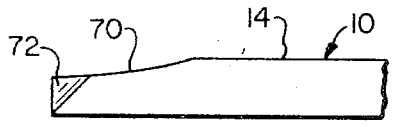
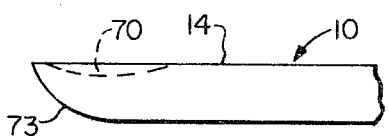
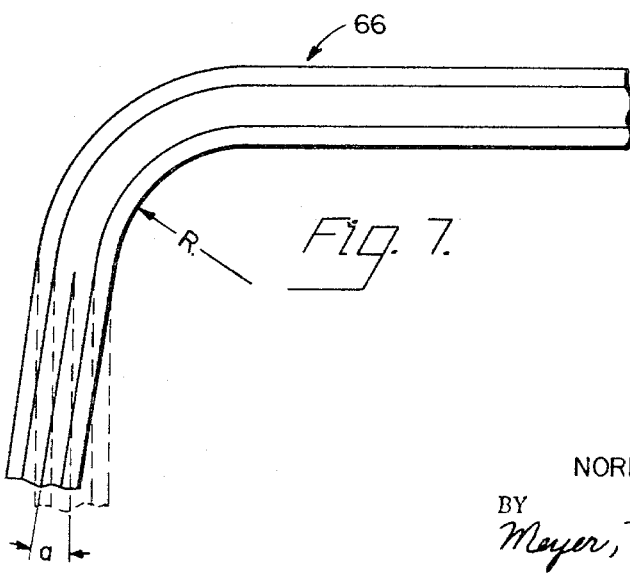
INVENTOR.
NORMAN C. JACKSON
BY
Meyer, Tilberry & Body
ATTORNEYS.

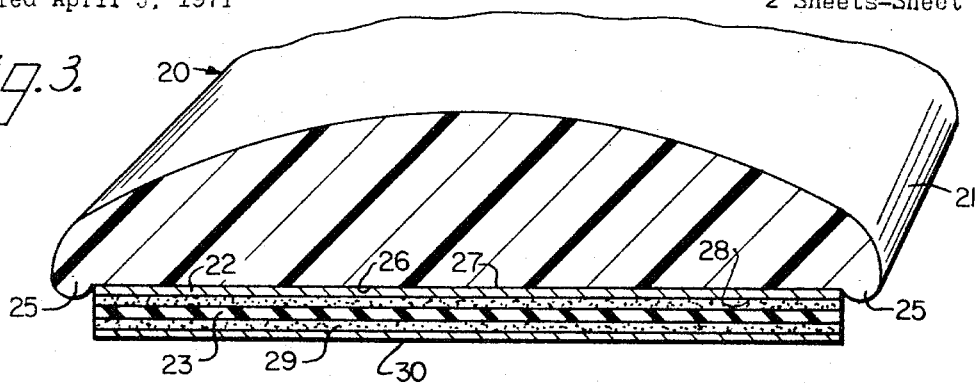
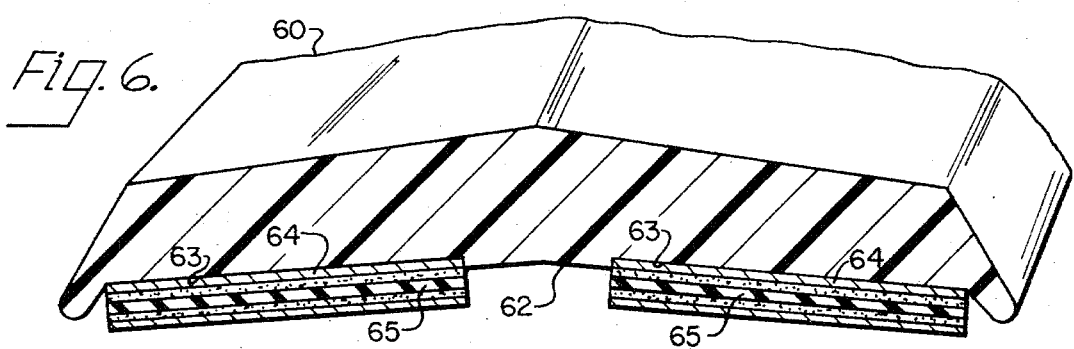
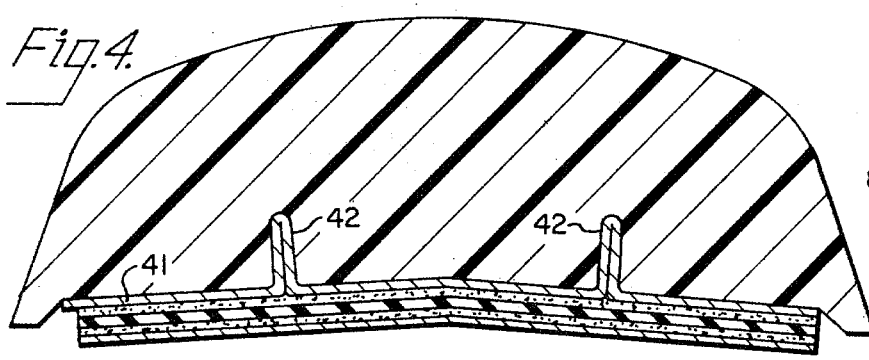
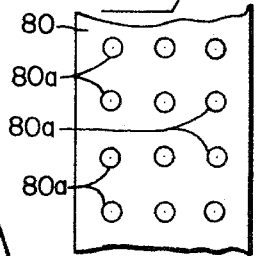
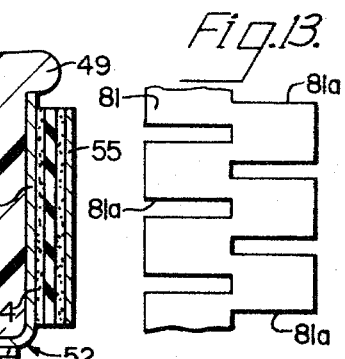

United States Patent Office 3,745,056
Patented July 10, 1973

3,745,056
TRIM STRIP STRUCTURE
Norman C. Jackson, Sheffield Lake, Ohio, assignor to The Standard Products Company, Cleveland, Ohio
Continuation-in-part of abandoned applications Ser. No. 706,098, Feb. 16, 1968, and Ser. No. 813,053, Apr. 3, 1969. This application Apr. 5, 1971, Ser. No. 131,410
Int. Cl. B32b 3/00, 3/02
U.S. Cl. 161—118
15 Claims

ABSTRACT OF THE DISCLOSURE

A trim strip structure comprised of a body of synthetic polymeric resinous material and a strip of thin metal, which resinous material and metal are of such a composition and so dimensioned and inter-related that the assembly is longitudinally and laterally stable and will readily take a set in any desired contour without any adverse effect on the appearance of the strip.

---

This invention relates to strip or molding structures and, more particularly, to strips or moldings adapted to be secured to surfaces for decorative and/or protective purposes.

This application is a continuation-in-part of my copending applications Ser. No. 706,098 filed Feb. 16, 1968, now abandoned and Ser. No. 813,053 filed Apr. 3, 1969, now abandoned.

Although the present invention will be disclosed in connection with decorative trim strips, it is to be understood that the principles of the invention have broader application and may be employed wherever an assembly of plastic and metal components are to be formed to a contour.

Trim strips of various configurations and appearances have been used extensively for many years in the automotive industry as a means to achieve desired decorative effects on the interior of an automobile and for protective purposes on the exterior of an automobile. Although such moldings or trim strips have been formed from metallic materials secured by clips, studs, or other types of fasteners to an automobile body, it has been suggested recently to construct these trim strips either partially or fully from a non-metallic material such as a plastic. In addition, it has been proposed to attach the non-metallic trim strip to the surface of the automobile body by the use of a pressure sensitive adhesive or by dielectric bonding. One such arrangement is illustrated in my copending application Ser. No. 734,907 filed June 6, 1968, now Pat. No. 3,543,465.

Among the requirements of industry concerning such trim strips is that the construction must be such that it may be used to similate the appearance of a polished stainless steel or to similate the appearance of other types of materials such as wood paneling. Another requirement of the strips is that they should be so constructed that they can be either dielectrically sealed or adhesively bonded to an automotive panel. The dielectric sealing of the strips to a panel normally is accomplished through the use of dielectric dies into which the decorative strips are placed and by a dielectric sealing process by which the strips are secured to the panels of the automobile in the desired position. Adhesive bonding may be achieved in many ways, one of the most suitable of which is the inter-position of a pressure sensitive adhesive tape or film between the strip and the underlying support surface.

A further requirement of industry is that the trim strip be capable of being readily formed through diverse contours from an initial contour which, for example, may be linear or which may be curved as a result of coiling a length of a strip for storage purposes. These diverse contours may require the strip to be formed to various radii in a single plane or may require the bending of the strip in multiple planes. This requirement of formability and bendability has several important facets. One obvious facet is that the forming of the trim strip to the desired contour must not cause any damage or otherwise alter the surface appearance of the strip. In other words, a strip structure suitable for the intended purpose must be capable of being formed to more than a very moderate radius without any crinkling or wrinkling of the material in the area of the bend. Another, less obvious, facet of this requirement of formability is that the strip structure should have the ability to retain its formed shape. Many strip structures used heretofore are undesirable because the material used in the strip acts much like a spring in that after the strip has been formed to a contour, the resilience of the material causes the strip to return or spring back substantially to the initial shape thereof. Such a strip structure is particularly difficult to handle in the dielectric process since the dielectric die must be continuously inspected and adjusted to assure that the formed strip is securely held in the die in the desired configuration. Further, especially where adhesive bonding is employed, the resiliency or memory of a strip will overcome the strength of the bond and cause separation of the strip from the underlying support panel. Thus, it is highly desirable that the trim strip be so constructed that it will retain its formed configuration.

Another facet of the formability requirement of trim strips is that the strip should be readily bendable. In using trim strips of this type, the strips may be manually inserted in a dielectric die and it is highly desirable that the strip be sufficiently bendable that the insertion of the strip into the die does not require any special tools. If adhesively bonded, the strip will be manually bent to the desired contour, whereby ease of bending is also desirable.

Among several problems which have retarded the widespread use of non-metallic material in trim strip construction in the automobile industry has been the selection of a suitable polymeric material. Many extruded synthetic polymers have the objection that they are not sufficiently stable in the longitudinal and transverse directions and will, over a period of time, tend to shrink thus resulting in an unsightly appearance. Moreover, this shrinkage may, when an adhesive is used as the means for securing the strip to a panel, cause the strip to pull away from the supporting surface.

Although certain flexible vinyl polymers appear to have the necessary dimensional stability and thus avoid the aforementioned problem, other problems have been encountered with the use of these materials with strips intended to be adhesively bonded in place. For example, the plasticizers employed in the manufacture of the vinyl have a tendency to migrate into the adhesive used to attach the trim strip and cause the adhesive to deteriorate. Moreover, there is a tendency for pigment particles and other ingredients in the adhesive to migrate from the adhesive into the vinyl resulting in some discoloration of the vinyl. To prevent this migration of plasticizers, it has been suggested to use an "ABS" resin in combination with the adhesive backing. However, this material is unduly rigid, prohibitively expensive and the resulting product has only fair longitudinal stability.

Still another requirement of trim strips of this character is that the strip must be susceptible to being formed at the end thereof to give the strip a finished appearance.

Still a further requirement is that the trim strip structure be so designed that a diversity of cross-sectional configurations may be produced on an economical basis while retaining the structural characteristics of stability and bendability sought.

Two primary types of trim strips or decorative moldings have been employed heretofore for dielectric bonding applications. One of these trim strips comprises a stainless steel material which is roll formed to the desired shape. Several problems have been incurred with such stainless steel strips. Considerable difficulty has been experienced in attempting to dielectrically seal the strips to the panels and, although stainless steel constructions have recently been developed that can be dielectrically sealed to the panels, the panel cannot be bent or formed after the stainess steel has been secured to it. Moreover, the use of roll formed stainless steel is considered to be an expensive construction and, for this reason, has not achieved the widespread usage that a less expensive construction could. Moreover, the advisability of using stainless steel moldings in certain areas of the interior of automobiles has been questioned on the basis that they might constitute a safety hazard.

The second type of trim strip or decorative molding that has achieved a significant amount of usage is a metallized, oriented polyester film which is laminated to a vinyl extrusion. One advantage of this construction over the stainless steel construction is that many more decorative effects can be obtained. Moreover, it can be dielectrically sealed to automotive panels and the panel can be bent or otherwise formed after the trim strip has been sealed to the panel. Substantial problems have also been experienced with strips of the latter construction, however, including the fact that the metallized polyester film has a distinct tendency to craze when the strip is formed to more than a very moderate radius. As a result, the use of such trim strips is severely restricted and they do not provide the desired flexibility which most interior stylists desire. Another disadvantage of the metallized polyester is that substantial difficulties have been experienced in controlling the dimensions of the strip. Thus, the length of the cut parts varies more than desired due to shrinkage and expansion which is an inherent characteristic of the plastic. Also, control of cross-section dimensions is extremely difficulty and causes substantial difficulties when adhesive bonding is employed and in use of a dielectric sealing operation. The difficulty with regard to dielectric sealing results from the dielectric dies being designed to accommodate a certain cross-sectional dimension of the strip and if the cross-section of the polyester strip is not maintained to a very critical tolerance, the strip may fit loosely in the die. In such circumstances, the inherent resilience of the polyester tends to cause the strip to spring out of the die so that the die must be continually re-adjusted to hold the strip firmly. This periodic adjustment of the dies requires the expenditure of time and labor which contributes to the overall manufacturing cost and which also interferes with the rhythm of production. Moreover, when the die has been adjusted to firmly grip the polyester, it has been found that crazing often occurs when the strip is pulled out of the die thereby rendering the strip unacceptable for use.

It is a primary object of this invention to provide a trim strip or decorative molding which overcomes all of the shortcomings experienced by the prior art and which satisfies each of the above mentioned requirements. In accordance with this primary object, this invention contemplates a trim strip or decorative molding comprising an assembly of a body of resilient synthetic organic polymer material of substantial thickness and a metal foil or sheet secured to the body. The invention is characterized by the ability of the assembly to be formed to a wide variety of contours without any adverse effect on the metal or polymer material, and is further characterized by the ability of the strip to be deformed from one contour to another and to remain in the other contour.

Another object of the present invention is the provision of a trim strip of the character mentioned which has longitudinal and transverse dimensional stability against shrinkage of the polymer material, together with formability.

Yet another object of the invention is to provide a trim strip structure of the character mentioned above which may be dielectrically or adhesively secured to an underlying support surface.

A further object of the invention is to provide a trim strip structure of the character mentioned above in which synthetic organic polymeric materials may be used with otherwise incompatible pressure sensitive adhesives to secure the strip to a support surface.

Still another object of the invention is to provide an improved trim strip structure which is simple in construction, economical to manufacture and easy to install.

More specifically, the invention contemplates a trim strip including a body of an extruded flexible vinyl polymeric material. The vinyl material may be selected from a wide range of thermoplastics all of which are characterized by their resilience and elasticity. The use of the terms "resilience" and "elasticity" are intended to refer to the ability of the plastic to absorb energy without suffering a permanent set. These terms are used with the full recognition that plastics, for the most part, are viscoelastic and, as such, the mechanical properties of the plastic change with time, temperature and applied stress. However, for purposes of this disclosure, the terms "resilience" and "elasticity" are appropriate since relatively short periods of time and relatively low levels of stress are contemplated. The viscoelastic properties of the plastic, over sufficient periods of time and at sufficiently high levels of stress would tend to accomplish the objects sought to be achieved by this invention in that any plastic strip would ultimately take a permanent set. It is totally unrealistic, however, to rely on such properties as a practical matter because of the very long time periods that would be required. Thus, for purposes of this disclosure, the vinyl material may be considered to possess characteristics illustrated in a typical stress-strain curve with Hookean properties exhibited up to a point which marks the proportional limit and beyond which the linear relationship between stress and strain no longer holds. The stress-strain curve further exhibits a point, the yield point or plastic limit, beyond which the deformation of the plastic is no longer elastic. For stresses up to the yield point, the material is ideally elastic, that is, the strain disappears on release of the stress. The resilient energy which the plastic will absorb is the area under the elastic portion of the stress-strain curve.

In combination with the vinyl material which has certain physical properties, the invention contemplates the use of a thin metal sheet or foil which is sufficiently thin that it has an extremely low resistance to bending forces applied perpendicular to the plane of the material.

Through the principles of this invention, the two basic elements, the vinyl material and the metal foil are combined in such a manner and in such a relationship that the combination exhibits qualities and characteristics which are possessed by neither when used alone and which qualities and characteristics are completely unexpected and highly desirable when the combination is used as a decorative or protective trim strip or molding. In this respect, the vinyl body and metal sheet are of such relative thicknesses that the resilience or memory of the vinyl body is overcome by the metal while the metal is desirably maintained extremely thin in comparison to the vinyl, whereby the vinyl and metal sheet as a unit are readily formable from one contour to another. The metal sheet provides the rigidity which the vinyl does not possess alone, and the vinyl provides a desirable contoured configuration exhibiting a considerable degree of mass while being light in weight and easy to manipulate, all of which characteristics would not be attainable with a metal body of similar cross section.

In one specific embodiment of the present invention, a vinyl material body of considerable thickness and a thin metallic foil are formed to a desired cross-section with the foil being on the exposed side of the body and in underlying relationship to a thin sheet of vinyl, whereby the foil may be said to be embedded in vinyl material. This structure may be formed to a bend of 90° or more without any adverse effects on the metallic material in terms of wrinkles or other physical deformations and will not return or "spring back" more than a very limited and permissible amount. Moreover, the foil provides transverse and longitudinal stability against shrinkage of the vinyl body. These most important characteristics of the invention may be achieved with trim strips of almost any cross-sectional configuration and the trim strips are readily adapted to economical manufacturing.

In another specific embodiment of this invention, there is provided a trim strip having a body of a flexible vinyl polymeric material which is disposed on one side of a thin strip of metal such as aluminum. Pressure sensitive adhesive is secured to the other side of the metal. With this basic arrangement several desirable advantages are obtained. The metal provides dimensional stability for the strip and overcomes any tendency of the material to shrink. Further, the metal provides a surface for the adhesive which permits bonding with an adhesive incompatible with the vinyl material. Moreover, the metal provides a barrier which prevents the migration of plasticizer into the adhesive from the vinyl and also prevents discoloration of the vinyl by the adhesive material. Still further, the metal enables the strip to be deformed to desired configurations, with the superior strength of the metal overcoming any tendency of the normally resilient vinyl material to spring back to its original shape.

A more complete understanding of the present invention will be had from a complete reading of the following description in connection with the attached drawings. The embodiments in the drawings and the terminology employed in describing them are not intended to be limiting since the drawings merely illustrate preferred structural embodiments and the terminology employed is merely a convenient method of describing the features and attributes of the invention.

Referring now to the drawings wherein like reference numerals indicate like parts in the various views:

FIG. 1 is a partial sectional view of a portion of one form of a trim strip constructed in accordance with the principles of this invention;

FIG. 2 is a view similar to FIG. 1 showing a modified trim strip;

FIG. 3 is a perspective view illustrating in section another form of trim strip made in accordance with the present invention;

FIG. 4 is a sectional view illustrating yet a further form of the trim strip of the present invention;

FIG. 5 is a sectional view of still another modied form of the strip of the present invention;

FIG. 6 is a sectional view, in perspective, illustrating another form of strip made in accordance with the present invention;

FIG. 7 illustrates a trim strip formed to a contour;

FIG. 8 is a plan view of the bottom surface at one end of the vinyl strip of FIG. 1;

FIG. 9 is a plan view of the bottom surface at one end of the completed trim strip of FIG. 1;

FIG. 10 is a side elevational view of the strip of FIG. 8;

FIG. 11 is a side elevation view of the strip of FIG. 9; and

FIGS. 12 and 13 illustrate alternate forms of the metal member of the strip illustrated in FIGS. 3–6.

Referring now to FIG. 1, there is illustrated a trim strip construction adapted to be dielectrically bonded to an underlying surface and made in accordance with the instant invention. This trim strip structure, indicated generally by the reference numeral 10, comprises a vinyl body portion 11, a metallic portion 12 and a vinyl covering 13 over the metallic portion. It is the vinyl and metallic elements, properly selected, formed and combined, which comprise the present invention.

Referring now to the vinyl body portion 11, the vinyl material may be any of several thermoplastics. Exemplary of such thermoplastics are plasticized polyvinylchloride or chlorinated polyethylene. However, these are merely cited by way of illustration and it is to be understood that other types of thermoplastics may be employed. Preferably, the thermoplastic material used should be transparent, although depending on the application to which the trim strip is put, a pigmented plastic could be used. Since it is sometimes desired to give a metallic effect to the trim strip, clear thermoplastic is most desirable.

The vinyl material 11 is normally extruded in conventional manner to whichever shape is desired and the particular configuration of the extrusion forms no part of the present invention. It is important to note, however, that as illustrated in the drawing, body 11 is many times greater in thickness than metallic member 12. The body 11 may, for example, be as much as 10 to 30 times the thickness of the metal member, and in the specific embodiment of FIG. 1, body 11 is approximately 25 times the thickness of metal member 12 in the area of the greatest thickness of the body. Thus, it will be appreciated that the trim strip is distinguished from thin metallic or plastic ribbons or the like.

The lower surface 14 of the vinyl body 11 may be completely flat or may deviate a small amount from perfect flatness and have a small concavity or convexity. It is desirable, however, that the deviation in the surface 14 be limited since it usually is necessary that the strip be placed in firm engagement against a flat surface. If the surface 14 is unduly irregular, the pressure required to firmly seat the surface 14 against the flat surface may result in distortion along the top surface and cause an undesirable appearance in the strip. A deviation of .015 inch from perfect flatness is an example of an acceptable tolerance for surface 14.

The vinyl material 11 must be so selected that it has sufficient rigidity to resist indentations and support the metal foil as hereinafter disclosed. On the other hand, the plastic must be sufficiently soft that it can be readily formed without the presence of heat. As an indicator of the rigidity of the vinyl material, the durometer hardness of such vinyl material is a satisfactory measure and should be in the range of 30–60 on the "D" scale at ambient temperature.

Referring now to the metallic portion 12 of the assembly 10, the material employed is preferably aluminum although other materials such as stainless steel may also be used. The aluminum is actually aluminum foil which in the specific embodiment of FIG. 1 has a thickness of approximately .005".

This thin metal foil, which may have a thickness in the range .0017 to .0059, is formed to a cross-sectional configuration which closely conforms to the cross-sectional configuration of the vinyl material. The foil is sufficiently thin and has a sufficiently low yield point that it has a low resistance to bending forces applied perpendicular to the plane of the material and can be readily given a permanent set or deformation. However, the foil should be sufficiently hard that it will resist indentation. In the embodiment of FIG. 1, the metal is shaped to a configuration which approximates a channel configuration and which configuration contributes to the strength of the strip. Although the formed metal strip without the vinyl material has a relatively high resistance to bending forces applied in the horizontal plane of the material perpendicular to the longitudinal axis of the strip as compared to the resistance of the vinyl material, such bending forces will readily cause undesirable crinkling, wrinkling, or other types of deformations in the channel in the area of the bend. This necessarily results from the fact that the channel shaped metal foil acts similar to a beam which is deflected under load when the channel is formed to a radius. Thus, tensile stresses are imposed on the material on one side of the neutral axis and compressive stresses are imposed on the metal on the other side of the neutral axis with the tensile stresses being located at the outside of the radius and the compressive stresses being at the inside of the radius. The ductility of the metal foil must be such that it will withstand without rupture the tensile stresses applied to the foil as a bend is made. However, the corresponding compressive stresses imposed on the metal foil almost invariably will cause the relatively thin section of the foil to rupture under load unless support is provided. Thus, in this embodiment the invention contemplates a metal section in which the bending of the metal will not cause the metal to rupture in tension but ordinarily will cause the metal section to first crumple under compression when formed to a radius.

As assembled, the foil is adapted to conform precisely to the upper surface of the vinyl body 11 so that the vinyl body provides a complete support for all points along the contacting surface of the foil. To assure proper support for the foil, it is highly desirable that an adhesive be employed to secure the foil to the vinyl. In this manner, the metal foil is supported and, as discused hereinafter, is thereby enabled to withstand stresses which it could not withstand without the support. It will be appreciated that the vinyl material could be extruded into the channel to achieve the desired close relationship between the body and metal.

The strip 10 is completed by a vinyl covering 13 which is placed over the metal foil 12 and, in effect, causes the foil to be embedded in the plastic. The film 13 is preferably of the same composition as the vinyl body 11 and provides a protective surface for the foil while at the same time, because of its transparency, permits the metal appearance to be observed.

It is important that the vinyl body 11 and the film 13 be firmly secured to the metal foil 12. This is best accomplished by the use of some form of adhesive material which may be coated on both sides of the metal foil. A commercially available plastisol adhesive or primer which will bond both to the metal and the vinyl material may be satisfactorily employed. The presence of the adhesive is of importance since it does assure that the vinyl material is bonded to the metal and it is this bonding or securement of the two basic elements comprising the strip structure which accomplishes the desired results. Thus, through the bonded relationship the desirable attributes of each of the components are blended together to overcome the undesirable individual attributes of each component. More specifically, the foil which, when formed, has a substantial resistance to bending stresses but which is unable to withstand the forming to a contour without crumpling is, because of the support provided by the vinyl material 11 and the film 13, able to be formed to radii otherwise unobtainable. This results from the relatively rigid support for the foil provided by the vinyl composition which has sufficient rigidity and stiffness to withstand the tendency of the foil to crumple as it is being formed. Moreover, the characteristics of the vinyl material are such that the vinyl body resists any change in dimension during the forming operation so that the cross-section of the strip remains constant throughout its length including the portion in the area of the bend. It will be appreciated that should the material have a tendency to elongate in the area of the bend as the strip is being formed that the result would be a decrease in the cross-sectional dimension of the strip and very possibly would result in a dimple or wrinkle in the area of the reduction in cross-section.

This ability of the vinyl composition to withstand a bend without substantial reduction in cross-sectional dimension or otherwise being deformed very significantly improves the performance of the metal foil in the assembled combination. However, the metal foil, also coacts with the vinyl composition to make the vinyl material acceptable for use in trim strip structures. Thus, the vinyl composition which is employed normally has a resilience or elasticity which is such that the strip would return to its original position or, at the very least, would have a substantial spring back characteristic. This characteristic would normally render the material unsuitable for trim strips which are to be formed to a contour. However, the metal foil has a substantial resistance to bending forces and acts as a retainer for the vinyl composition and overcomes the memory of the composition. Thus, the metal foil readily takes a permanent set and has sufficient strength to resist any tendency of the vinyl to spring back.

A specific example of a combination of thermoplastic and foil which has proven to be satisfactory in the forming of bendable trim strips of the character illustrated in FIG. 1 is as follows:

The vinyl composition is a polyvinyl chloride compound without filler, the color is transparent and the specific gravity is .127. The durometer hardness is 42±4, per ASTM 1076 Shore "D" 15 second delay method. The foil is aluminum, .005 inch in thickness and has a typical ultimate strength of 17,000 p.s.i. and has a 4% elongation in five inches. The aluminum has a temper designation of H–25. Both sides of the foil are coated with a primer P–66CA1 marketed by the Sherwin Williams Company of Cleveland, Ohio. The vinyl film 13 is approximately .010 inch in thickness. The vinyl thickness is approximately twenty-five times the thickness of the foil in the area of greatest thickness of the vinyl and the volume of the vinyl material per linear inch of strip is approximately fifteen and one-half times greater than the volume per linear inch of the foil.

With the basic construction shown in FIG. 1, many variations may be employed. For example, the upper surface 15 of the aluminum foil may be coated with an acrylic ink with aluminum particles in suspension which, when applied to the foil, will simulate the appearance of a brushed aluminum finish. Also the depressions or valleys 16 on opposite sides of the foil may be painted black or any other color depending upon the particular decorative effect desired.

FIG. 2 illustrates an alternate arrangement in which the strip 10 is identical to FIG. 1 except that a simulated wood panel 18 is applied over the vinyl film 13 along the upper surface of the aluminum foil. Obviously, many other materials giving other effects may be employed with the basic strip structure 10. The addition of such strips further compounds the difficulties of forming the strip structures to a contour since any deformation in the strip beneath the covering 18 will tend to rupture the adhesion between the covering 18 and the film 13 with the consequence that the covering will be susceptible to peeling. However, with the trim strip structure above described, no such deformation or rupture of the adhesion occurs and the strip FIG. 2 may be formed to contours as readily as the strip of FIG. 1.

Referring now to FIG. 3 there is illustrated a molding or strip structure assembly indicated generally by the reference numeral 20. This strip comprises a vinyl body portion 21, a metal foil member 22, and adhesive securing means 23. It is this broad combination of vinyl body and foil which cooperates to provide a strip structure having the advantage stated hereinabove.

It will be appreciated that the strip structure may be employed in various ways with one specific application being the use of the strip in combination with an automobile panel to provide a decorative appearance. However, regardless of the specific uses to which the strip structure may be put, it will be understood that the adhesive securing means 23 comprises the means by which the strip is to be secured to the supporting surface in this particular embodiment.

Referring now in detail to the strip structure, the body portion 21 is preferably of an extruded flexible vinyl polymeric composition which may or may not contain a plasticizer of a migratory type. The precise configuration of the body portion 21 may vary depending on the particular decorative or utilitarian purpose for which the strip is to be employed. With respect to the particular strip shown in FIG. 3, the body portion has a contoured decorative outer surface 24 which curves downwardly on either longitudinal edge to form longitudinally extending ridges 25. Intermediate the ridges 25, there is formed in the lower surface of the body portion 21, a longitudinally extending recess 26. This recess is adapted to receive metallic strip 22.

Strip 22 may be of any suitable material and, in the preferred embodiment of the invention, the strip comprises an aluminum sheet; however, other metals may be used depending on the use of the strip. Further, the thickness of the metal sheet may also be varied depending on the specific application to which the strip is to be put. For example, if the strip is merely to be attached to a flat surface with no contoured configuration, and the metal is only to serve as a bonding surface, it may be sufficient to use an extremely thin aluminum foil. However, if the strip is to be shaped into contours, a somewhat more rigid, yet bendable metal sheet is desirable, since, as discussed hereinafter, the metal sheet overcomes any tendency of the resilient vinyl to spring back to its original configuration. Moreover, the thicker metal sheet more effectively resists any tendency of the vinyl body to shrink over an extended period of time.

To secure the aluminum sheet or other material in the recess 26 it is desirable to prime the upper surface 27 of the aluminum sheet with a suitable primer which thereby enables the vinyl body portion 21 to be bonded directly to the aluminum sheet as the body portion is extruded.

To secure the strip 20 to the supporting surface, there is applied to the lower surface 28 of the sheet 22 the adhesive means 23. This adhesive means may be any of several commercially available tapes such as poly-urethane or expanded neoprene which are pressure sensitive on both sides. The upper surface of the tape 23 is adhesively applied to the lower surface 28 of the sheet 22 while the lower adhesive surface 29 of the tape normally is protected by a releasable paper backing 30, which, when the strip is to be attached to a supporting surface, is removed and discarded.

It will be appreciated that the sheet 22 need not necessarily be placed in a recess in body 21. For example, the sheet may be secured directly to the flat lower surface of the strip with the adhesive tape being subsequently secured to the sheet. Moreover, the sheet need not be continuous. For example, the sheet 22 may comprise a series of spaced strips of material which adequately serve to space the tape from the vinyl body portion but which also reduce the material cost for the assembly.

As illustrated in FIG. 3, body portion 21 is many times greater in thickness than metal member 22 when measured through the area of greatest thickness of the body portion. Body portion 21 may, for example, be 10 to 20 times the thickness of metal member 22. Thus, again it is to be noted that the trim strip distinguishes from a thin tape or the like which has no body and is unable to support its own weight when supported in a horizontal disposition in cantilever fashion. The trim strips of the present invention, while being readily deformable from one contour to another will, when suspended horizontally, support their own weight and will not droop or sag.

In a specific example of a trim strip having the characteristics of the strip of the embodiment of FIG. 3, body portion 21 is an extruded vinyl having a durometer hardness of 49±5 Shore "D" 15 second delay method, and the metal member is an aluminum strip of approximately 0.010 inch thickness. The vinyl body is approximately 20 times the thickness of the foil in the area of greatest thickness of the vinyl body. The volume of the body portion per linear inch is approximately 17 times the volume per linear inch of the metal strip. The adhesive is neoprene tape, one thirty-second inch thick and the tape is pressure sensitive on both sides.

It will be appreciated that the strip structure of this embodiment can be adhesively bonded to an underlying surface by means other than pressure sensitive tape. In this respect, adhesive in liquid form could be readily applied by brushing or the like on the metal member and the strip then applied to an underlying surface. Moreover, the strip could be positioned on the underlying surface and an adhesive material could then be introduced between the strip and surface under pressure, by injection or the like. The tape is simply a preferred manner of adhesive application.

Referring now to the embodiment illustrated in FIG. 4, the strip employs the same combination of elements as those in the embodiment of FIG. 3; however, the metal sheet 41 has a ribbed construction comprised of ribs 42 extending longitudinally of the sheet and embedded in the vinyl body. Two ribs are illustrated in FIG. 4, but it is to be appreciated that more or less than that number may be employed. Again, as illustrated in the drawing, the body of the strip is many times greater in thickness than the metal member 41.

The construction of FIG. 4 is particularly advantageous in applications in which the strip is to be formed to a contour or radius in a plane transverse to the longitudinal plane of the strip. The ribs 42 provide the necessary rigidity to maintain the strip in the formed contour and permit the use of a thinner metal member than would be required if ribs were not employed.

Referring now to FIG. 5, there is illustrated a trim strip 45 adapted for attachment to angularly disposed surfaces. One specific application for this construction is as a trim molding around a windshield for an automobile.

The trim strip 45 includes a body portion 46 having a contoured decorative upper surface 47 curving downwardly along one longitudinal edge of the strip to form a longitudinally extending ridge 48. The other longitudinal edge of the strip has a similar ridge 49 which is adjacent the upper surface 47. Thus, between the two ridges 48 and 49 there are two areas defined by the lower surface 50 and the side 51 of the strip to which adhesive means may be applied for securement of the strip. To these surfaces 50 and 51 there is applied a metal strip 52 which, in the embodiment shown, is L-shaped in cross-section having right angularly disposed legs 53 and 54. Obviously, other angular relationships of the legs may be employed depending on the specific application for the strip. Moreover, it will be appreciated that the two legs may be separated rather than formed as a unitary member. Pressure sensitive adhesive tape 55 is applied to the otherwise exposed surfaces of legs 53 and 54. It will be obvious from the drawing that, as in the previous embodiments, body portion 46 is many times greater in thickness than metal strip 52 when the thickness is measured transversely of the plane of the metal strip.

With the arangement of FIG. 5 the strip may be preformed to fit a contour such as a curved windshield with the leg 53 contributing the necessary rigidity to maintain the contour in the longitudinal plane of the strip and the leg 54 maintaining the contour in the plane transverse to the longitudinal plane. The tape 55 on leg 53 may be used to secure the molding to the windshield glass while the tape 55 on leg 54 may be used to attach the molding to the adjacent sheet metal on the body of the automobile. Adhesive means other than tape, of course, may be employed as discussed above with regard to the embodiment of FIG. 3.

Referring now to FIG. 6, there is illustrated a further modification of the trim strip of the present invention. As shown in that figure the strip 60 comprises a body portion 61 which, as in FIG. 3, may be made from any suitable organic polymer but preferably from an extruded flexible vinyl polymer. Body portion 61 has a contoured decorative outer surface, and the lower surface 62 of the body portion is not planar but rather comprises two angularly disposed surfaces in each of which is formed a recess 63. The recesses 63 are each adapted to receive metal strips, preferably aluminum sheets 64, in the manner described in connection with the strip of FIG. 3. It will again be noted that body portion 61 is many times greater in thickness than the metal strip 64. Attached to the lower surface of each of the aluminum sheets 64 is a length of neoprene tape 65 which, like the tape 23, is pressure sensitive on both sides. The strip 60 is in all other respects substantially the same as the strip shown in FIG. 3 but the strip 60 is, because of the angular configuration of the lower surface 62 and the tape 65, well adapted to be secured to a non-planar surface.

Obviously, angular relationships of the bottom surface 62 and tapes 65 other than that shown in FIG. 6 may be employed depending on the particular application of the strip. Moreover, it should be understood that metal sheet 64 need not necessarily be in two parts but could be made continuous in the shape of the lower surface 62.

All of the foregoing embodiments of FIGS. 3, 4, 5 and 6 possess the desirable characteristic of being susceptible to being shaped to a wide variety of configurations. For example, the strip may be bent to a radius in its longitudinal plane with the combination of the flexible vinyl material and the metal sheet cooperating to maintain the strip in its bent configuration. Moreover, no special tools or instruments are required to shape the strip to its desired configuration. Thus, the bendable metal is not so rigid that it prevents deformation but it is sufficiently strong to resist the stored energy possessed by the body portion when the body portion is formed to a contour and which stored energy tends to return the body portion to its initial contour.

In view of the foregoing description, it will be appreciated that in each of the embodiments of FIGS. 3, 4, 5 and 6 the thin metal member provides several desirable functions. In this respect, the metal member provides longitudinal and transverse stability to the vinyl body against shrinkage of the body, is sufficiently flexible to permit bending the strip from one contour to another and is sufficiently rigid to overcome the memory of the vinyl body which would otherwise return the strip to its initial contour. Further, the metal member provides a surface to which adhesive may be applied for the purpose for bonding the strip to an underlying surface, thus permitting the use of adhesives which otherwise would be incompatible with the vinyl body. Further, in the event that the vinyl body includes a plasticizer of a migratory type, the metal member provides a barrier which prevents migration of the plasticizer into the adhesive or contamination of the vinyl by the adhesive material.

Referring now to FIG. 7, an important characteristic of the present invention is schematically illustrated. Thus, a trim strip structure 66 is shown as being formed around a radius R so that the resultant formed strip has a bend of slightly less than 90°. To accomplish the bend, the resilience of the vinyl material must be compensated for only very slightly by over bending the strip through an angle $a$ and releasing the strip and permitting the strip to spring back a small amount. It is this characteristic of being readily formed to a substantial angular bend with only a very minimal spring back and without adversely affecting the surfaces of the metal or plastic that is among the more distinguishing characteristics of this invention. No prior art construction is known which can be readily formed manually to a substantially 90° bend without excessive spring back and/or damage to the appearance of the strip. As pointed out above, it is the combination of the resilient vinyl material with the very thin metal foil which together cooperate to accomplish this result. The bend shown in FIG. 7 is, of course, but one angle to which the structure may be formed. Moreover, the strip structure is not confined to angular bends in a single plane. Multiple bends in various planes may be made in the strip without any adverse effects on the structure and the forming of this strip is intended to encompass all such bends of whatever contour or configuration.

Referring now to FIGS. 8 through 11, there is illustrated the end construction of the strip illustrated in FIGS. 1 and 2 which is designed to give a finished appearance to the strip. The finished end is achieved by removing a portion 70 of the vinyl material from the under surface 14 of the strip 10 adjacent to the end. The depth of the cut made in the vinyl may vary but preferably extends into the vinyl to the lower edges 17 of the foil 12. The cut extends from the free end of the strip for a distance along the strip which is at least equal to the width of the strip. Thereafter, angular cuts 71 and 72 are made on opposite sides of the centerline of the strip at the free end thereof so that a portion of the vinyl 11 as well as a portion of the foil 12 is removed. Thereafter, as shown in FIGS. 9 and 11, the end of the strip is deformed by bending over the end of the strip until the upper surface on the free end of the strip is co-planar with the surface 14 and presents a smooth contour 73 on the upper surface of the free end.

The finished product has relief portions which extend from the recess 70 in lower surface 14 of the strip to the upper surface thereof. The relief portions are indicated in the finished strip (FIG. 9) as relieved corners 71 and 72. In the finished strip, these corners are usually not sharply chamfered or beveled, nor are they completely and perfectly rounded. Thus, they are referred to herein as "relief portions." The removal of the vinyl composition in the areas 71 and 72 enables the end of the strip to be bent as illustrated without developing any unsightly wrinkles or crumpling the metal foil. In this manner, a finished appearance can be given to the end of the strip structure and one which does not present a potential source for snagging clothes or causing injury to persons in the automobile.

In FIGS. 12 and 13 of the drawing there is illustrated modified forms of thin metal members adapted to be employed in the trim strips illustrated in FIGS. 3-6 in place of the metal members depicted in the latter figures. In FIG. 12 thin metal member 80 is provided with a plurality of holes or perforations 80a, and in FIG. 13, metal member 81 is provided with a plurality of transverse slots 81a. The holes and slots may be punched or otherwise suitably provided in the metal member and serve to increase the flexibility thereof. The holes and slots, however, are of a size and are located relative to one another in a manner whereby the stability, bendability and barrier functions thereof are retained. Moreover, the holes and slots are small enough that there can be no appreciable migration of plasticizer from the vinyl body portion through an underlying adhesive layer or deterioration of the vinyl by the adhesive material. In this respect, the slots and holes are small enough that adhesive will not enter these openings, and thus, will be maintained spaced from the vinyl body.

Although considerable emphasis has been placed herein on the fact that the trim strips of FIGS. 1 and 2 are adapted to be dielectrically bonded to an underlying surface, it will be appreciated that the strips of these embodiments may be otherwise secured to an underlying surface, such as by adhesive means for example. Moreover, if adhesive means is employed it will be further appreciated that a thin metal member may be employed to separate the adhesive from the vinyl body as hereinabove described in conjunction with the embodiments of FIGS. 3-6. Moreover, it will be appreciated that the trim strip embodiments herein described can be mounted to an underlying surface by fastening means other than an adhesive or a dielectric bond.

It is believed apparent from the above description that each of the requirements initially set forth are met with the described construction and that all of the shortcomings of the prior art have been overcome. Thus, the strip structures of this invention have the following combination of advantages, characteristics and attributes:

(1) The strips may be either dielectrically or adhesively bonded to an underlying surface.

(2) The strips may be economically produced in various configurations and designs.

(3) The strips may be used in various combinations with decorative coverings and paints or pigments to provide a diversity of decorative effects.

(4) The strips may be readily formed at the end to give the part a finished appearance.

(5) The strips have both longitudinal and transverse dimensional stability and are therefore particularly suited to adhesive bonding and dielectric sealing.

(6) The resilient vinyl composition does not present a safety hazard in an automobile.

(7) The strips can be readily formed to remain in contours of any shape to give such pleasing decorative effects as desired by the stylist.

(8) The strip has the unique ability to retain its formed shape despite the resilience of the vinyl material.

(9) The ability to retain its formed shape diminishes the need for precise accuracy of dielectric dies when the latter are used.

(10) The strips may be formed to contours without causing any noticeable crazing or surface imperfections in the vinyl or metal foil.

(11) Panels to which the strips are secured may be formed or bent after a strip has been bonded thereto.

The listing of these advantages, characteristics and attributes is not intended to be exhaustive but merely to point up the versatility and substantial advance in the art which this invention has made. Nor is the listing of these advantages intended to infer that other strip structures may not possess some of the advantages in varying degrees. However, it is believed that there has been no decorative trim strip or molding known heretofore which combines all of the above-mentioned characteristics and advantages in the manner achieved by the instant invention.

Modifications and changes in the invention will suggest themselves to those having ordinary skill in the art and it is intended that changes and modifications such as these are to be included within the scope and intent of the invention as defined by the appended claims.

I claim:

1. An elongated trim strip adapted to be mounted on an underlying surface comprising:
   an elongated body portion of a flexible and resilient thermoplastic polymer, said body portion being readily deformable from one contour to another and the resilience of said thermoplastic polymer causing the body portion when deformed to store force tending to return the body portion to the one contour when unrestrained,
   a thin metal member bonded to and extending along at least a first surface of said body portion for said body portion and metal member to define a coextensive bonded unit,
   said body portion having a thickness transverse to said first surface greater than the thickness of said metal member,
   said metal member and body portion as a bonded unit being readily deformable from one contour to another and said metal member being sufficiently rigid to resist the restoring force possessed by the deformed body portion tending to return the body portion to the one contour.

2. The strip structure of claim 1, wherein said body portion is a vinyl material having a durometer hardness of 49±5 on the Shore "D" scale, 15 second delay method and said metal member is aluminum, and wherein said strip is adapted to be secured to said underlying surface by adhesive means interposed between said metal member and said underlying surface.

3. The strip structure of claim 1, wherein said first surface is remote from and exposed relative to an underlying surface onto which said strip is adapted to be mounted.

4. The strip structure of claim 3, and a thin plastic film overlying said metal member, and adhesive means bonding said film to said metal member and said metal member to said body portion.

5. The strip structure of claim 1, wherein said body portion is a vinyl material having a durometer hardness in the range of 30–60 on the Shore "D" scale, 15 second delay method.

6. The strip structure of claim 5, wherein the thickness of said metal member is between .0017 and .0059 inch.

7. The strip structure of claim 5, wherein said metal member is aluminum having a thickness of approximately .010 inch.

8. The strip structure of claim 1, wherein said strip is adapted to be secured to said underlying surface by adhesive means interposed between said metal member and said underlying surface, whereby said adhesive means is separated from said body portion by said metal member.

9. The strip structure of claim 8, wherein said adhesive means is a layer of adhesive adhered to at least a portion of the exposed surface of said metal member.

10. The strip structure of claim 8, wherein said metal member includes rib means projecting into said body portion transversely of said first surface and extending longitudinally of said body portion to impart rigidity to said strip in a plane transverse to the longitudinal plane of the strip.

11. The strip structure of claim 8, wherein said metal member is secured to and extends along first and second angularly related adjacent surfaces of said body portion.

12. An elongated trim strip adapted to be mounted on an underlying surface comprising:
   an elongated non-metallic body portion of thermoplastic polymer containing a plasticizer of a migratory type,
   a thin metal member bonded to and extending along at least a first surface of said body portion,
   said body portion having a thickness transverse to said first surface greater than the thickness of said metal member and having a contoured decorative second surface remote from said first surface,
   said strip being adapted to be secured to said underlying surface by adhesive means interposed between said metal member and said underlying surface, whereby said adhesive means is separated from said body portion by said metal member.

13. The strip structure of claim 12, wherein said metal member and said body portion are readily deformable from one contour to another and said metal member is sufficiently rigid to resist the restoring force possessed by the polymer of the deformed body portion tending to return the body portion to the one contour.

14. The strip structure of claim 12, wherein said adhesive means is a layer of adhesive adhered to at least a portion of the otherwise exposed surface of said metal member.

15. The strip structure of claim 14 wherein said metal member includes means projecting into said body portion transversely of said first surface and extending longitudinally of said body portion to impart rigidity to said strip in a plane transverse to said first surface.

(References on following page)

References Cited

UNITED STATES PATENTS

| | | | |
|---|---|---|---|
| 3,226,287 | 12/1965 | Shanok et al. | 161—175 |
| 2,348,658 | 5/1944 | Slaughter | 161—39 X |
| 3,635,787 | 1/1972 | Shanok et al. | 161—121 |
| 3,439,950 | 4/1969 | Kunevicius | 161—161 X |
| 2,928,201 | 3/1960 | Shanok et al. | 161—101 X |
| 3,138,834 | 6/1964 | Shanok et al. | 161—101 X |
| 3,076,590 | 1/1962 | Shanok et al. | 161—118 X |
| 3,310,928 | 3/1967 | Weimar | 52—716 |
| 3,419,458 | 12/1968 | Brooks et al. | 161—121 |

WILLIAM A. POWELL, Primary Examiner

U.S. Cl. X.R.

161—112, 117, 119, 123, 149, 167, 406, 413